United States Patent
Anthony et al.

(10) Patent No.: US 10,403,028 B2
(45) Date of Patent: Sep. 3, 2019

(54) SYSTEM AND METHOD FOR GEOMETRIC WARPING CORRECTION IN PROJECTION MAPPING

(71) Applicant: CHRISTIE DIGITAL SYSTEMS USA, INC., Cypress, CA (US)

(72) Inventors: Roy Anthony, Waterloo (CA); Kevin Moule, Kitchener (CA); Derek Scott, N2B 3W4 (CA); Nick Wasilka, Kitchener (CA); Maxwell Elendt, Toronto (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 0 days.

(21) Appl. No.: 16/056,763

(22) Filed: Aug. 7, 2018

(65) Prior Publication Data

US 2018/0342097 A1   Nov. 29, 2018

Related U.S. Application Data

(63) Continuation of application No. 15/215,668, filed on Jul. 21, 2016, now Pat. No. 10,115,226.

(51) Int. Cl.
| | | |
|---|---|---|
| *G06T 3/00* | (2006.01) | |
| *H04N 9/31* | (2006.01) | |
| *G06T 15/10* | (2011.01) | |
| *G06T 17/20* | (2006.01) | |
| *G06T 19/20* | (2011.01) | |

(52) U.S. Cl.
CPC ............. *G06T 15/10* (2013.01); *G06T 3/005* (2013.01); *G06T 17/20* (2013.01); *G06T 19/20* (2013.01); *H04N 9/3185* (2013.01); *G06T 2210/36* (2013.01); *G06T 2219/2021* (2013.01)

(58) Field of Classification Search
CPC ................... G06T 17/00; G06T 3/4053; G06T 2207/20016; G06T 15/04
See application file for complete search history.

(56) References Cited

U.S. PATENT DOCUMENTS

| | | | |
|---|---|---|---|
| 2003/0052890 A1* | 3/2003 | Raskar | G06T 15/503 345/581 |
| 2007/0211939 A1* | 9/2007 | Kaus | A61B 6/00 382/173 |
| 2011/0078223 A1* | 3/2011 | Maekawa | G06T 17/20 708/270 |

OTHER PUBLICATIONS

Anthony, Roy, et al., "System and Method for Geometric Warping Correction in Projection Mapping", U.S. Appl. No. 15/215,668, filed Jul. 21, 2016.

(Continued)

*Primary Examiner* — Haixia Du
(74) *Attorney, Agent, or Firm* — Perry + Currier, Inc.

(57) ABSTRACT

A system and method for geometric warping correction in projection mapping is provided. A lower resolution mesh is applied to A mesh model, at least in a region of the mesh model misaligned with a corresponding region of a real-world object. One or more points of the lower resolution mesh are moved. In response, one or more corresponding points of the mesh model are moved to increase alignment between the region of the mesh model and the corresponding region of the real-world object. An updated mesh model is stored in a memory. And one or more projectors are controlled to projection map images corresponding to the updated mesh model onto the real-world object.

16 Claims, 10 Drawing Sheets

(56) References Cited

OTHER PUBLICATIONS

EPO, Communication pursuant to Article 94(3) EPC, Aug. 28, 2018, re European Patent Application No. 17178190.9.
Zhou, Yi, et al. "Pmomo: projection mapping on movable 3D object." Proceedings of the 2016 CHI Conference on Human Factors in Computing Systems. ACM, 2016.
Bermano, Amit, et al. "Augmenting physical avatars using projector-based illumination." ACM Transactions on Graphics (TOG) 32.6 (2013): 189.
Kadambi, Achuta, et al., "Polarized 3D: High-Quality Depth Sensing with Polarization Cues", Proceedings of the IEEE International Conference on Computer Vision, 2015.
McDonald, Kyle, mapamok (English), GitHub, Inc., Feb. 1, 2012, Retrieved from the Internet on Apr. 9, 2019, URL: https://github.com/YCAMInterlab/ProCamToolkit/wiki/mapamok-(English).
Raskar, Ramesh, et al., "Multi-Projector Displays Using Camera-Based Registration", Proceedings Visualization '99 (Cat. No. 99CB37067). IEEE, 1999.

\* cited by examiner

SYSTEM AND METHOD FOR GEOMETRIC WARPING CORRECTION IN PROJECTION MAPPING

FIELD

The specification relates generally to projectors, and specifically to a system and method for geometric warping correction in projection mapping.

BACKGROUND

Projection mapping is a projection technique that uses specialized software and other technologies to warp and blend projected images so they fit on irregularly-shaped "screens" such as surfaces of buildings, interior spaces and natural landscapes. The result is that almost any surface can be masked to become a dynamic video display of images that can transform and/or enhance and/or augment "reality" for an audience. In producing such augmented reality experiences, accurate models of real-world objects are paramount as any inaccuracy between the model and the object onto which images are to be projected can lead to errors in projection mapping of the images which, at a minimum, can erode the audience experience. While one solution to correcting does such inaccuracies is to manually warp each output channel, for each projector used for the projection mapping, such a solution needs to be repeated every time an alignment between the projectors and the real-world object changes.

SUMMARY

In general, this disclosure is directed to a system and method for geometric warping correction in projection mapping. In particular, a system that includes one or more projectors stores a mesh model of a real-world object onto which images are to be projected. The mesh model of the real-world object is used to configure the images for projection mapping. However, when the mesh model is different from the real-world object, a lower resolution mesh model can be applied to the higher resolution mesh model, and points in the lower resolution mesh model can be moved to also move points in the higher resolution mesh model into a state of alignment with the real-world object. The updated higher resolution mesh model can then be stored and used for projection mapping onto the real-world object which it represents and specifically used for geometric warping correction in projection mapping. In this manner, the underlying mesh model is changed so that automatic method of projection mapping images onto the real-world object can be used without having to manually warp the images to account for misalignments and/or inaccuracies each time a position between the projectors and/or the real-world object changes.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

An aspect of the specification provides a system comprising: one or more projectors configured to projection map onto a real-world object; a memory storing a mesh model of the real-world object; and, a controller configured to: apply a lower resolution mesh to the mesh model, at least in a region of the mesh model misaligned with a corresponding region of the real-world object, the lower resolution mesh having one or more of a lower resolution and a lower point density than the mesh model; move one or more low-res points of the lower resolution mesh; and, in response, move one or more corresponding high-res points of the mesh model, including any high-res points located between the one or more low-res points, to increase alignment between the region of the mesh model and the corresponding region of the real-world object; store an updated mesh model in the memory based on the one or more corresponding high-res points of the mesh model that moved with the one or more low-res points of the lower resolution mesh; and, control the one or more projectors to projection map images corresponding to the updated mesh model onto the real-world object.

The lower resolution mesh can comprise one or more of: a vertex cage; a vertex clustering simplification of the mesh model; an incremental decimation of the mesh model; and, a subset of the high-res points of the mesh model.

The system can further comprise an input device, wherein the controller can be further configured to determine the regions of the mesh model misaligned with the corresponding regions of the real-world object by: receiving input from the input device identifying the regions.

The lower resolution mesh can be generated manually via input selecting sets of high-res points of the mesh model to be affected by a single newly created low res-point at a center of gravity of selected high-res points.

The controller can be further configured to determine the region of the mesh model misaligned with the corresponding region of the real-world object by: comparing one or more of the mesh model and the lower resolution mesh with a point cloud representing the real-world object.

The controller can be further configured to determine the region of the mesh model misaligned with the corresponding region of the real-world object by: comparing one or more of the mesh model and the lower resolution mesh with a point cloud representing the real-world object using one or more of point-comparison techniques, feature matching techniques, key-feature-related techniques and normal-related techniques.

The controller can be further configured to automatically determine the region of the mesh model misaligned with the corresponding region of the real-world object by one or more of: calculating a respective distance of each of the one or more low-res points of the lower resolution mesh to a respective closest point in a point cloud representing the real-world object; and calculating a respective distance of each of the one or more high-res points of the mesh model to a respective closest point in a point cloud representing the real-world object.

The controller can be further configured to automatically move one or more low-res points of the lower resolution mesh to an intersection of a respective lines determined from respective normals of respective vertexes of the lower resolution mesh and a mesh generated from a point cloud representing the real-world object until an alignment occurs between the region of the mesh model and a respective corresponding region of the point cloud.

The controller can be further configured to move one or more low-res points of the lower resolution mesh until an alignment occurs between the region of the mesh model and a respective corresponding region of a point cloud representing the real-world object.

The controller can be further configured to control the one or more projectors to projection map respective images corresponding to one or more intermediate updated mesh models onto the real-world object while the one or more low-res points of the lower resolution mesh are being moved.

Another aspect of the specification provides a method comprising: at a system comprising: one or more projectors configured to projection map onto a real-world object; a memory storing a mesh model of the real-world object; and, a controller, applying, using the controller, a lower resolution mesh to the mesh model, at least in a region of the mesh model misaligned with a corresponding region of the real-world object, the lower resolution mesh having one or more of a lower resolution and a lower point density than the mesh model; moving, using the controller, one or more low-res points of the lower resolution mesh; and, in response, move one or more corresponding high-res points of the mesh model, including any high-res points located between the one or more low-res points, to increase alignment between the region of the mesh model and the corresponding region of the real-world object; storing, using the controller, an updated mesh model in the memory based on the one or more corresponding high-res points of the mesh model that moved with the one or more low-res points of the lower resolution mesh; and, controlling, using the controller, the one or more projectors to projection map images corresponding to the updated mesh model onto the real-world object.

The lower resolution mesh can comprise one or more of: a vertex cage; a vertex clustering simplification of the mesh model; an incremental decimation of the mesh model; and, a subset of the high-res points of the mesh model.

The system can further comprise an input device, and the method can further comprise determining the regions of the mesh model misaligned with the corresponding regions of the real-world object by: receiving input from the input device identifying the regions.

The method can further comprise generating the lower resolution mesh manually via input selecting sets of high-res points of the mesh model to be affected by a single newly created low res-point at a center of gravity of selected high-res points.

The method can further comprise determining the region of the mesh model misaligned with the corresponding region of the real-world object by: comparing one or more of the mesh model and the lower resolution mesh with a point cloud representing the real-world object.

The method can further comprise determining the region of the mesh model misaligned with the corresponding region of the real-world object by one or more of: comparing one or more of the mesh model and the lower resolution mesh with a point cloud representing the real-world object using one or more of point-comparison techniques, feature matching techniques, key-feature-related techniques and normal-related techniques.

The method can further comprise automatically determining the region of the mesh model misaligned with the corresponding region of the real-world object by one or more of: calculating a respective distance of each of the one or more low-res points of the lower resolution mesh to a respective closest point in a point cloud representing the real-world object; and calculating a respective distance of each of the one or more high-res points of the mesh model to a respective closest point in a point cloud representing the real-world object.

The method can further comprise automatically moving one or more low-res points of the lower resolution mesh to an intersection of a respective lines determined from respective normals of respective vertexes of the lower resolution mesh and a mesh generated from a point cloud representing the real-world object until an alignment occurs between the region of the mesh model and a respective corresponding region of the point cloud.

The method can further comprise moving one or more low-res points of the lower resolution mesh until an alignment occurs between the region of the mesh model and a respective corresponding region of a point cloud representing the real-world object.

The method can further comprise controlling the one or more projectors to projection map respective images corresponding to one or more intermediate updated mesh models onto the real-world object while the one or more low-res points of the lower resolution mesh are being moved.

Yet a further aspect of the specification provides a computer-readable medium storing a computer program, wherein execution of the computer program is for: at a system comprising: one or more projectors configured to projection map onto a real-world object; a memory storing a mesh model of the real-world object; and, a controller, applying, using the controller, a lower resolution mesh to the mesh model, at least in a region of the mesh model misaligned with a corresponding region of the real-world object, the lower resolution mesh having one or more of a lower resolution and a lower point density than the mesh model; moving, using the controller, one or more low-res points of the lower resolution mesh; and, in response, move one or more corresponding high-res points of the mesh model, including any high-res points located between the one or more low-res points, to increase alignment between the region of the mesh model and the corresponding region of the real-world object; storing, using the controller, an updated mesh model in the memory based on the one or more corresponding high-res points of the mesh model that moved with the one or more low-res points of the lower resolution mesh; and, controlling, using the controller, the one or more projectors to projection map images corresponding to the updated mesh model onto the real-world object. The computer-readable medium can comprise a non-transitory computer-readable medium.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
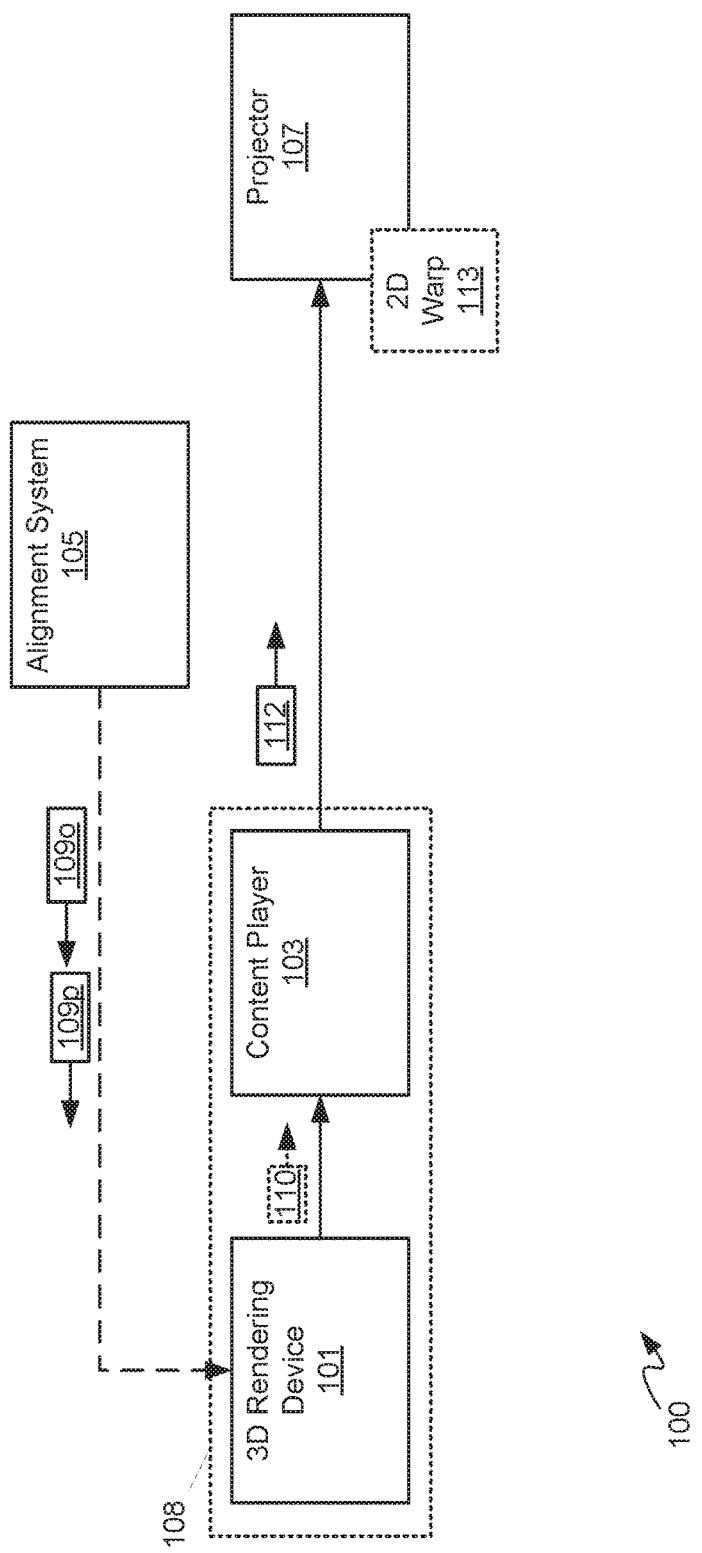
FIG. 1 depicts a projection system, according to non-limiting implementations.

FIG. 1 depicts a system 100 from co-pending U.S. patent application Ser. No. 14/820,693, which is incorporated herein by reference. System 100 comprises: a 3D ("three-dimensional") rendering device 101 (interchangeably referred to hereafter as device 101); a content player 103; an alignment system 105; and a projector 107. In general, device 101 is in communication with content player 103 and alignment system 105, and content player 103 is in communication with projector 107. As depicted, device 101 and content player 103 are combined into one device 108, however in other implementations device 101 and content player 103 are separate devices. Alignment system is configured to generate pose data 109p comprising a virtual location, a virtual orientation and virtual lens characteristics of a virtual camera corresponding to projector 107, and communicate pose data 109p to device 101, as described in further detail below. Device 101 can generate rendered image data 110 from pose data 109p, for example by rendering existing image data (not depicted) for projection by projector 107. In FIG. 1, solid lines connecting components show flow of image and/or video data there between, while the stippled line connecting alignment system 105 to device 101 and/or device 108 shows flow of pose data 109p and object data 109o there between. Pose data 109p can also be referred to as calibration data as pose data 109p represents a calibration of system 100 to account for a position of projector 107 and/or positions of objects upon which images are to be projected. Object data 109o generally comprises a virtual location and virtual orientation of a virtual model of an object in a virtual three-dimensional environment, with respect to a virtual origin, that corresponds to a physical three-dimensional environment where the object is located.

When device 101 and content player 103 are separate, device 101 communicates image data 110 to content player 103, which processes and/or "plays" image data 110 by producing projection data 112 suitable for processing and projection by projector 107. For example, image data 110 can include, but is not limited to, an AVI file, a series of JPG files, a PNG file, and the like. Projection data 112 can include, but is not limited to, HDMI data, VGA data, and/or video transport data. When device 101 and content player 103 are combined in device 108, device 108 can render projection data 112 (e.g. video data) in real-time without producing image data 110. In any event, projection data 112 is communicated to projector 107 by content player 103 where projection data 112 is used to control projector 107 to project images based thereupon, for example onto a three-dimensional object.

Device 101 generally comprises an image generator and/or renderer, for example a computing device, a server and the like, configured to generate and/or render images as image data 110. Such image data 110 can include, but is not limited to, still images, video and the like. Furthermore, while not depicted device 101 can be in communication with, and/or comprise, an image generator and/or a memory storing data from which image data 110 can be generated and/or rendered. Alternatively, device 101 can generate image data 110 using algorithms, and the like, for generating images.

Content player 103 comprises a player configured to "play" and/or render image data 110; for example, when image data 110 comprises video data, content player 103 is configured to play and/or render the video data by outputting projection data 112 for projection by projector 107. Hence, content player 103 can include, but is not limited to a video player, a video processing device, a computing device, a server, and the like. However, as described above, when device 101 and content player 103 are combined as device 108, rendering of image data 110 can be eliminated and device 108 renders projection data 112 without producing image data 110.

Alignment system 105 comprises any suitable combination of projectors (including projector 107), cameras (not depicted in FIG. 1), and computing devices configured to one or more of: automatically determine parameters of projector 107; and automatically determine a location and orientation of a three-dimensional object onto which images are to be projected.

Projector 107 comprises a projector configured to project projection data 112, including but not limited to a digital projector, a cinema projector, an LCOS (Liquid Crystal on Silicon) based projector, a DMD (digital multimirror device) based projector and the like. Furthermore, while only one projector 107 is depicted, system 100 can comprise a plurality of projectors 107, each configured to project respective projection data comprising, for example, portions of larger tiled image to be projected.

As depicted system 100 further comprises one or more 2D ("two-dimensional") warping devices and/or modules 113, for example at projector 107 (though such a warping device can be present at content player and/or as a stand-alone device) When present, projection data 112 can be warped by warping module 113, for example by moving and/or adjusting pixels within projection data 112, to adjust projection data 112 for projection by projector 107 onto a three-dimensional object. However, as alignment system determines pose data 109p and communicates such to device 101 (and/or device 108), warping module 113 can be unused, optional and/or eliminated from system 100. Indeed, use of warping module 113 represents how images were processed according to the prior art and the presence of warping module 113 is obviated by virtue of alignment system 105 providing device 101 (and/or device 108) with pose data 109p. However, in some implementations, warping module 113 can be used to make small changes to projection of images onto a real-world object, for example when a virtual model of the object used to produce the images does not precisely match the real-world object.

While each of device 101, content player 103, alignment system 105, and projector 107 are depicted as distinct components, in other implementations, respective portions of one or more of device 101, content player 103, alignment system 105, and projector 107 and can be implemented within the same device (e.g. device 108) and/or processing resources can be shared there between. For example, while not depicted, system 100 comprises one or more processors, one or more memories and one or more communication interfaces, for example a processor, memory and communication interface for each of device 101, content player 103, alignment system 105, and projector 107 and/or to be shared among device 101, content player 103, alignment system 105, and projector 107. Indeed, in general, components of system 100, as depicted, represent different functionality of a projection system where: parameters of projector 107 can be automatically determined, and automatically adjusted when projector 107 moves; a location and orientation of a three-dimensional object onto which images are to be projected can be automatically determined (and automatically adjusted when the three-dimensional object moves); and images are adjusted for projection onto the three-dimensional object.

Figure 2:
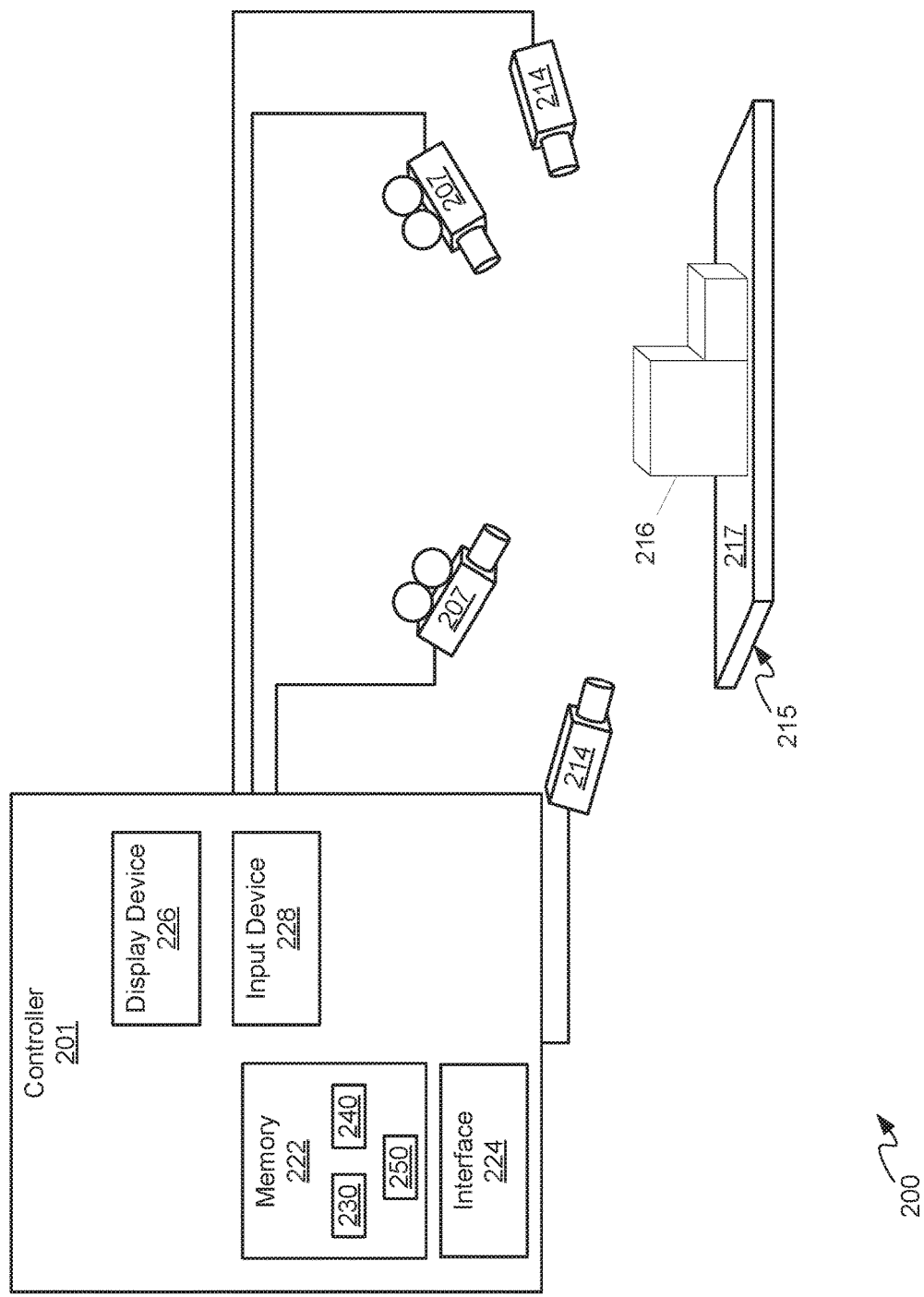
FIG. 2 depicts a system for geometric warping correction in projection mapping, which can be used in the system of FIG. 1, according to non-limiting implementations.

Attention is next directed to FIG. 2 which depicts a system 200 geometric warping correction in projection mapping. Components of system 100 can comprise components of system 200 as desired. System 200 can also be provided independent of system 100. However, in some implementations, data generated from system 100 can be used in system 200, for example point clouds representing real-world objects generated using cameras and projectors of system 200 as described hereafter.

System 200 comprises a controller 201, two projectors 207; and two cameras 214, each of projectors 207 and cameras 214 mounted relative to a three-dimensional environment 215 (interchangeably referred to hereafter as environment 215) with respective fields of view of cameras 214 at least partially overlapping a projection area of projectors 207 on environment 215. In particular, projectors 207 are mounted to projection map images onto a real-world object 216 located in environment 215. However, cameras 214 can be optional, but also can be components of alignment system 105. Furthermore, projectors 207 can also be components of alignment system 105. Indeed, projector 107 can comprise one or more projectors 207, alignment system 105 can comprise controller 201, projectors 207 and cameras 214, and any of device 101 and content player 103 can comprise at least a portion of controller 201, for example when resources are shared amongst device 101, content player 103 and alignment system 105.

While two projectors 207 are depicted, system 200 can comprise more than two projectors 207 and as few as one projector 207. Similarly, while two cameras 214 are depicted, system 200 can comprise more than two cameras 214, one camera 214 or no cameras. However, when at least two cameras 214 are used with alignment system 105, the at least two cameras 214 are positioned to provide at least one stereo view of environment 215.

Like projector 107, each projector 207 comprises a projector configured to project projection data, including but not limited to a digital projector, a cinema projector, an LCOS (Liquid Crystal on Silicon) based projector, a DMD (digital multimirror device) based projector and the like. In particular, one or more projectors 207 are configured to projection map onto real-world object 216. When more than one projector 207 is present, projectors 207 can project respective images comprising, for example, portions of larger tiled image to be projected.

Each camera 214, when present, can comprise one or more of a digital camera, a CCD (charge coupled device) and the like.

As depicted, environment 215 comprises a three-dimensional and/or real-world object 216 (interchangeably referred to hereafter as object 216), which can optionally be placed on a flat surface 217. While object 216 is depicted as a geometric and/or rectilinear block comprising two adjacent cuboids of different sizes with flat surfaces, in other implementations, object 216 can comprise one or more of: a curved surface; an irregular surface, and the like, including, but not limited to, screens and the like. Indeed, object 216 can comprise any object (and/or plurality of objects) having depth onto which images are to be projected by one or more projectors 207 using, for example, projection mapping.

Controller 201, interchangeably referred to hereafter as controller 201 can comprise any suitable computing device, including but not limited to a graphics processing unit (GPU), a graphics processing device, a graphics processing engine, a video processing device, a personal computer (PC), a server, and the like, and generally comprises a memory 222 and a communication interface 224 (interchangeably referred to hereafter as interface 224) and optionally a display device 226 and at least one input device 228 which, when present, can be external to controller 201 and in communication with controller 201 via interface 224.

Controller 201 further comprises a processor and/or a plurality of processors, including but not limited to one or more central processors (CPUs) and/or one or more processing units and/or one or more graphic processing units (GPUs); either way, controller 201 comprises a hardware element and/or a hardware processor. Indeed, in some implementations, controller 201 can comprise an ASIC (application-specific integrated circuit) and/or an FPGA (field-programmable gate array) specifically configured to implement the functionality of controller 201.

In other words, controller 201 can be specifically adapted for geometric warping correction in projection mapping. Hence, controller 201 is preferably not a generic computing device, but a device specifically configured to implement specific geometric warping correction functionality in projection mapping. For example, controller 201 can specifically comprise a computer executable engine configured to implement specific geometric warping correction functionality in projection mapping.

Memory 222 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of controller 201 as described herein are typically maintained, persistently, in memory 222 and used by controller 201 which makes appropriate utilization of volatile storage during the execution of such programming instructions. Those skilled in the art recognize that memory 222 is an example of computer readable media that can store programming instructions executable by controller 201. Furthermore, memory 222 is also an example of a memory unit and/or memory module and/or a non-volatile memory.

Memory 222 generally stores an application 230 and a mesh model 240 of real-world object 216, which can be provisioned at memory 222 in a provisioning step, for example by an administrator of system 100 and/or system 200. Mesh model 240 will be described in more detail below.

Memory 222 can further store one or more images 250 (interchangeably referred to hereafter as images 250) that are to be projection mapped onto real-world object 216 by projectors 207. In particular, images 250 can comprise images that can be partitioned between projectors 207 for tiled projection onto different surfaces of object 216, for example by warping images 250 for projection onto different surfaces of object 216, according to mesh model 240. In other words, as mesh model 240 can represent object 216, controller 201 (and/or components of system 100) can process images 250 and mesh model 240 (and, in some implementations pose data 109p and object data 109o) to determine which portions of images 250 to project onto respective surfaces of object 216. However, if mesh model 240 does not accurately represent object 216, the projection mapping will be inaccurate.

Hence, application 230, when processed by controller 201, enables controller 201 to: apply a lower resolution mesh to mesh model 240, at least in a region of mesh model 240 misaligned with a corresponding region of real-world object 216, the lower resolution mesh having one or more of a lower resolution and a lower point density than mesh model 240; move one or more low-res points of the lower resolution mesh; and, in response, move one or more corresponding high-res points of mesh model 240, including any high-res points located between the one or more low-res points, to increase alignment between the region of mesh model 240 and the corresponding region of real-world object 216; store an updated mesh model in memory 222 based on the one or more corresponding high-res points of mesh model 240 that moved with the one or more low-res points of the lower resolution mesh; and, control one or more projectors 207 to projection map images 250 corresponding to the updated mesh model onto real-world object 216. The terms "lower resolution" and "lower point density" can be used interchangeably, however the term lower resolution can also refer to the lower resolution mesh having a fewer number of triangles and/or polygons than mesh model 240, for example when each of the lower resolution mesh and mesh model 240 are represented by a mesh of triangles and/or a mesh of polygons as described in more detail below.

In some implementations, application 230, when processed by controller 201, can further enable controller 201 to: determine the region of mesh model 240 misaligned with the corresponding region of real-world object 216 by: comparing mesh model 240 and/or lower resolution mesh (described below) with a point cloud representing real-world object 216. Such a point cloud can be obtained using systems and methods described in co-pending U.S. patent application Ser. No. 14/820,693.

In particular, in some implementations, application 230, when processed by controller 201, can further enable controller 201 to: automatically determine the region of mesh model 240 misaligned with the corresponding region of real-world object 216 by: calculating a respective distance of each of the one or more low-res points of the lower resolution mesh to a respective closest point in a point cloud representing real-world object 216.

Alternatively, in other implementations, application 230, when processed by controller 201, can further enable controller 201 to: automatically determine the region of mesh model 240 misaligned with the corresponding region of real-world object 216 by: calculating a respective distance of each of the one or more high-res points of mesh model 240 to a respective closest point in a point cloud representing real-world object 216.

However, in yet further implementations, application 230, when processed by controller 201, can further enable controller 201 to: determine the regions of mesh model 240 misaligned with the corresponding regions of real-world object 216 by: receiving input from input device 228 identifying the regions.

In particular, in some implementations, application 230, when processed by controller 201, can further enable controller 201 to: control one or more projectors 207 to projection map respective images 250 corresponding to one or more intermediate updated mesh models onto real-world object 216 while the one or more low-res points of the lower resolution mesh are being moved.

Interface 224 comprises any suitable wired or wireless communication interface configured to communicate with projector 207 and cameras 214 (and any of device 101, content player 103, alignment system 105, and device 108) in a wired and/or wireless manner as desired.

Controller 201 can further comprise optional display device 226, which comprises any suitable one of, or combination of, flat panel displays (e.g. LCD (liquid crystal display), plasma displays, OLED (organic light emitting diode) displays, capacitive or resistive touchscreens, CRTs (cathode ray tubes) and the like). Controller 201 can further comprise optional input device 228, which is configured to receive input data; as such, input device 228 can comprise any suitable combination of input devices, including but not limited to a keyboard, a keypad, a pointing device, a mouse, a track wheel, a trackball, a touchpad, a touch screen (e.g. integrated with display device 226), and the like. Other suitable input devices are within the scope of present implementations.

Figure 3:
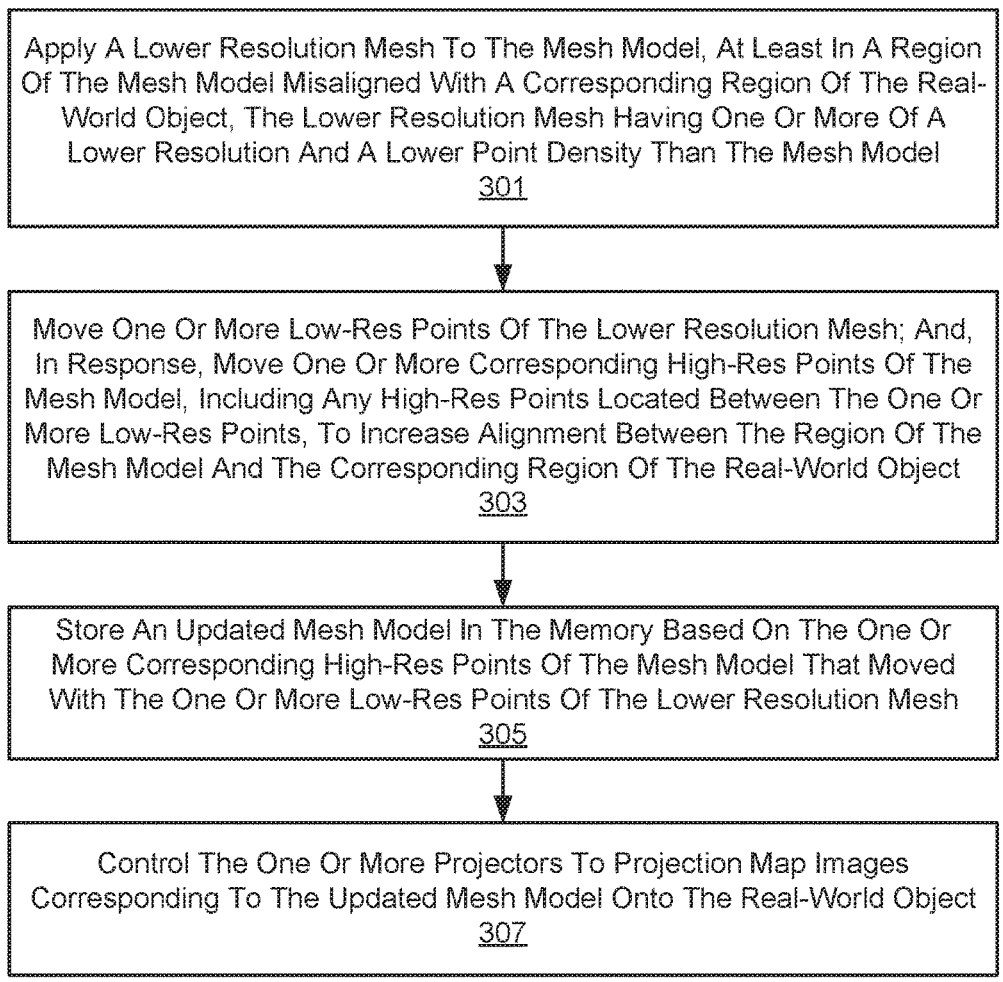
FIG. 3 depicts a flowchart of a method for geometric warping correction in projection mapping, according to non-limiting implementations.

Attention is now directed to FIG. 3 which depicts a flowchart of a method 300 for geometric warping correction in projection mapping, according to non-limiting implementations. In order to assist in the explanation of method 300, it will be assumed that method 300 is performed using system 200, and specifically by controller 201, for example when controller 201 processes application 230. Indeed, method 300 is one way in which system 200 and/or controller 201 can be configured. Furthermore, the following discussion of method 300 will lead to a further understanding of controller 201, and system 200 and its various components. However, it is to be understood that system 200 and/or controller 201 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of system 200 as well. Furthermore, while controller 201 is described as implementing and/or performing each block of method 300, it is appreciated that each block of method 300 occurs using controller 201 processing application 230.

At block 301, controller 201 applies a lower resolution mesh to mesh model 240, at least in a region of mesh model 240 misaligned with a corresponding region of real-world object 216, the lower resolution mesh having one or more of a lower resolution and a lower point density than mesh model 240.

At block 303, controller 201 moves one or more low-res points of the lower resolution mesh; and, in response, moves one or more corresponding high-res points of mesh model 240, including any high-res points located between the one or more low-res points, to increase alignment between the region of mesh model 240 and the corresponding region of real-world object 216;

At block 305, controller 201 stores an updated mesh model in memory 222 based on the one or more corresponding high-res points of mesh model 240 that moved with the one or more low-res points of the lower resolution mesh.

At block 303, controller 201 controls one or more projectors 207 to projection map images corresponding to the updated mesh model onto real-world object 216.

Method 300 will now be described with reference to FIG. 4 to FIG. 10.

Figure 4:
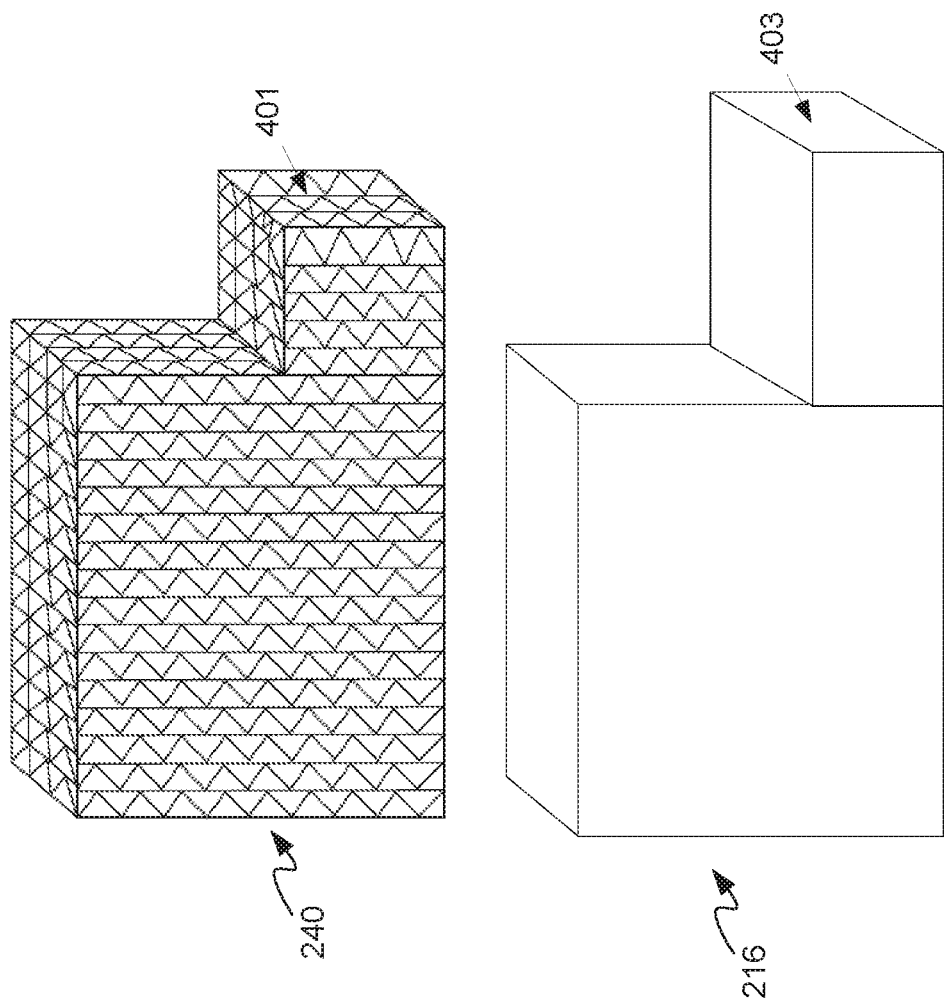
FIG. 4 depicts a comparison between an inaccurate mesh model of a real-world object, and the real-world object, according to non-limiting implementations.

Attention is hence next directed to FIG. 4, which depicts a comparison between object 216 and mesh model 240, and in particular a visual rendering of mesh model 240, for example at display device 226. Furthermore, while a given view of both object 216 and mesh model 240 is shown in FIG. 4, it is appreciated both that object 216 is a three-dimensional object that could be viewed from other positions, and that mesh model 240 can be rendered and/or oriented accordingly. Furthermore, while the terms "left", "right", "top" and "bottom" will be used herein in describing object 216 and/or mesh model 240, etc., it is appreciated that such terms are relative only to the given view of object 216 and/or mesh model 240, etc. shown in FIG. 4, and/or in other figures.

In particular, mesh model 240 comprises a high resolution mesh model which is intended to be a model of object 216. As depicted, mesh model 240 comprises one or more of a mesh of triangles, a mesh of polygons and the like. Vertices of mesh model 240, as depicted, are located where the triangles and/or polygons intersect. Each vertex can correspond to a point of mesh model 240. Further, the points of mesh model 240 will be interchangeable referred to hereafter as "high-res" points, to distinguish them from "low-res" points of a lower resolution mesh model, described below.

Any process for generating mesh model 240 will occur to those of skill in the art and are within the scope of present implementations; for example, mesh model 240 can be constructed from techniques that include, but are not limited to, wire-frame modeling of real-world objects. Furthermore, mesh model 240 can include, but is not limited to, one or more of a polygon mesh (as depicted), a vertex-vertex mesh, a face-vertex mesh, a winged-edge mesh, a render dynamic mesh, and the like. However, other types of mesh models are within the scope of present implementations.

Regardless, it is assumed in method 300 that mesh model 240 has been generated and provisioned at memory 222, and that mesh model 240 comprises a model of object 216. However, in at least region 401, mesh model 240 is not aligned with a corresponding region 403 of object 216, and/or in at least region 401, mesh model 240 does not accurately represent object 216. While only one region 401 of misalignment is described herein, more than one region of misalignment can be present in mesh model 240.

In particular, object 216 comprises two cuboids, adjacent to each other: a larger cuboid on a left side, and a smaller cuboid on the right side, adjacent the larger cuboid. Similarly, mesh model 240 represent a larger cuboid on a left side, and smaller cuboid on the right side, adjacent the larger cuboid. Surfaces of mesh model 240 are generally aligned with surfaces of object 216; as is clear from FIG. 4, however, a region 401 of mesh model 240 that corresponds to a right-hand outer face of the smaller cuboid is not aligned with the corresponding region 403 of object 216. In particular, the smaller cuboid of mesh model 240 is shorter than the corresponding smaller cuboid of object 216.

Indeed, the term aligned as used herein can refer to an alignment between mesh models of objects when images corresponding to surfaces of a mesh model are projected onto a corresponding object using projection mapping: when surfaces of the mesh model and the object are aligned (e.g. the mesh model is an accurate representation of the object), the images are projected correctly onto the surfaces of the object; when surfaces of the mesh model and the object are not aligned (e.g. the mesh model is not an accurate representation of the object), the images are not projected correctly onto the surfaces of the object.

Figure 5:
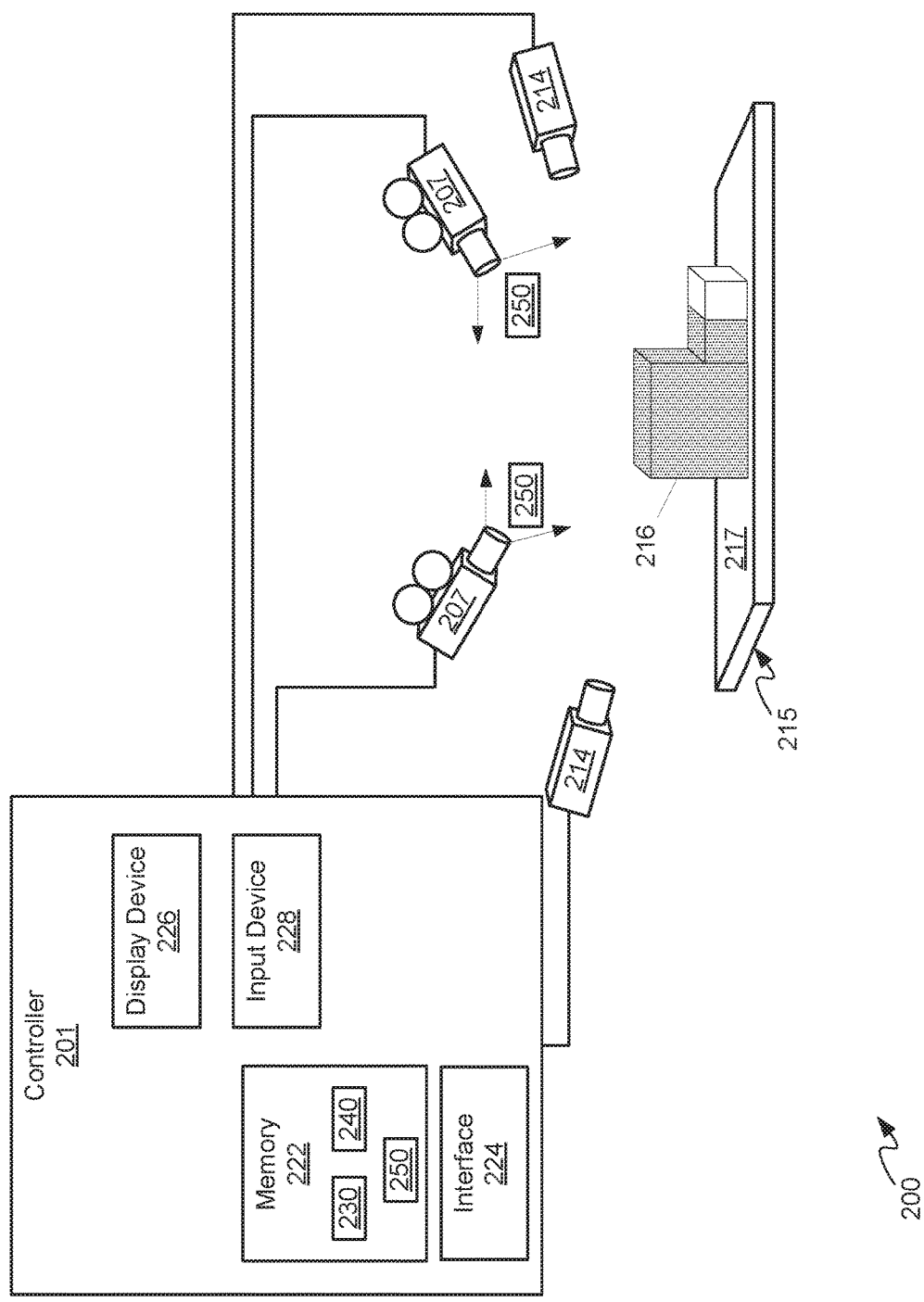
FIG. 5 depicts the system of FIG. 2 when the inaccurate mesh model of the real-world object is used to projection map onto the real-world object, according to non-limiting implementations.

For example, attention is directed to FIG. 5, which depicts projectors 207 projection mapping images 250 onto object 216, as represented by the shaded areas of object 216; as at least one region of mesh model 240 is misaligned with a corresponding region of object 216, images 250 are not properly mapped onto object 216, and at least a portion of the smaller cuboid is free of images (e.g. projectors 207 are not projecting images 250 onto a portion of the smaller cuboid that is meant to have images 250 projected thereupon). In other words, geometric warping corrections used in the projection mapping are based, at least in part, on an inaccurate mesh model.

While in FIG. 5, improper projection mapping is represented by images 250 being not present at surfaces of object 216, such improper projection mapping due to misalignment between mesh model 240 and object 216 can include, but is not limited to, distortion of images 250 on object 216 (e.g. inaccurate warping), images 250 being projected onto surface 217 instead of object 216, and the like.

Such alignment and/or misalignment can also be described to as follows: if a life size version of mesh model 240 were overlayed onto object 216 (and oriented and/or resized accordingly), and if mesh model 240 accurately represents object 216, then all the surfaces of mesh model 240 and object 216 would be aligned and/or projection mapping of images 250 onto object 216 using mesh model 240 is accurate; otherwise, if mesh model 240 does not accurately represent object 216, than one or more surfaces of mesh model 240 and object 216 would be misaligned and/or projection mapping of images 250 onto object 216 using mesh model 240 is inaccurate.

Put yet another way, a region of a mesh model (such as mesh model 240) misaligned with a corresponding region of a real-world object (such as object 216) can comprise an inaccurate region of the mesh model. Such inaccuracies can include, but are not limited to, regions of a mesh model being larger or smaller than corresponding regions of an object (e.g. which can result when pieces and/or areas of the object have been broken and/or deformed), surfaces of a mesh model having different slopes and/or curvature than corresponding region of an object, and the like.

Figure 6:
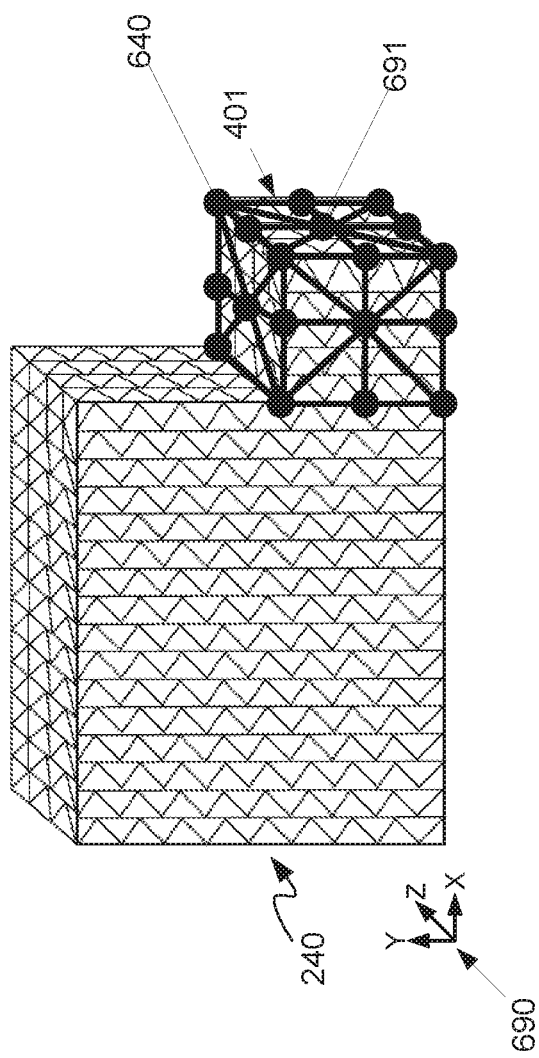
FIG. 6 depicts a lower resolution mesh applied to the inaccurate mesh model, at least in a region of the inaccurate mesh model misaligned with a corresponding region of the real-world object, according to non-limiting implementations.

Attention is next directed to FIG. 6 which depicts a non-limiting implementation of an aspect of block 301. Block 301 can occur within controller 201 and/or in conjunction with rendering mesh model 240 at display device 226.

In particular, FIG. 6 depicts mesh model 240 and lower resolution mesh 640 being applied to mesh model 240, at least in region 401 of mesh model 240 determined to be misaligned with a corresponding region 403 of object 216, lower resolution mesh 640 having one or more of a lower resolution and a lower point density than mesh model 240.

For example, lower resolution mesh 640 can comprise a subset of points selected from mesh model 240. Further, low-res points in lower resolution mesh 640 are depicted as being connected to more explicitly show the mesh formed by the points of lower resolution mesh 640, which can be similar to the mesh of mesh model 240, but of lower resolution.

A number of "low-res" points in lower resolution mesh 640 can be determined using input device 228, for example by providing, at display device 226, a request for a point density, and the like, of lower resolution mesh 640, and, in response, receiving a point density used to select a subset of high-res points of mesh model 240. In some implementations, such a point density can be provided in a format of $(N_X, N_Y, N_Z)$, assuming that mesh model 240 can be referenced according to an XYZ coordinate system 690, as depicted. Each of $(N_X, N_Y, N_Z)$ represents a density of a subset of high-res points of mesh model 240 that are to be included in lower resolution mesh 640: in an "X" direction, every $N_x^{th}$ high-res point is to be selected, in a "Y" direction, every $N_y^{th}$ high-res point is to be selected, and in a "Z" direction, every $N_z^{th}$ high-res point is to be selected.

Alternatively, (Nx,Ny,Nz) can represent a resolution that defines a size of the lower resolution mesh 640 with or with reference to mesh model 240. For example, lower resolution mesh 640 can have a resolution of Nx points along the X axis, Ny points along the Y axis, and Nz points along the Z axis which can include, but is not limited to, high-res points of mesh model 240. A resolution of N points along an axis can refer to N points per unit length along the axis. For example, when (Nx,Ny,Nz) =(3, 3, 3), the low-res mesh 640 would have a resolution of (3, 3, 3) and/or 3 points per unit length along each of the X, Y and Z axes.

Alternatively, each low-res point of lower resolution mesh 640 can be selected individually using input device 228, assuming that mesh model 240 is being rendered at display device 226.

Either way, in these implementations, controller 201 can be configured to determine regions of mesh model 240 misaligned with corresponding regions of real-world object 216 by: receiving input from input device 228 identifying the regions. In particular, while only one region 401 is depicted in FIG. 4, more than one region can be misaligned and/or inaccurate.

In some of these implementations, lower resolution mesh 640 is generated manually via input (e.g. from input device 228) selecting sets of high-res points of mesh model 240 to be affected by a single newly created low res-point, which can be located at a "center of gravity" of selected high-res points.

For example, in particular, newly generated and/or created low res-low-res point 691 of lower resolution mesh 640 corresponds to a point of mesh model 240 that is located at about a center and/or at about a center of gravity of region 401, the "center of gravity" being determined manually and/or by controller 201 processing mesh model 240 and a point cloud representing object 216, as described in more detail below, the center of gravity comprising low res-low-res point 691 that can be moved to align other high-res points of mesh model 240 as described in more detail below.

However, specification of a point density of lower resolution mesh 640 can occur in any suitable manner, including, but not limited to, storing, in application 230 and/or in memory 222 a predetermined point density to be automatically applied to mesh model 240 to produce lower resolution mesh 640, when application 230 is being processed by controller 201. Alternatively, "low-res points" of lower resolution mesh 640 need not comprise a subset of "high-res points" of mesh model 240; in other words, low-res points of lower resolution mesh 640 can be located between high-res points of mesh model 240.

Alternatively, lower resolution mesh 640 can comprise a vertex clustering simplification of mesh model 240, as understood by persons of skill in the art. For example, as depicted, lower resolution mesh 640 comprises a vertex cage at least in region 401. In yet further alternatives, lower resolution mesh 640 can comprise an incremental decimation of mesh model 240. Indeed, any suitable method for generating lower resolution mesh 640 is within the scope of present implementations.

Regardless, lower resolution mesh 640 has a lower resolution and/or a lower point density as compared to mesh model 240. However, lower resolution mesh 640 also represents at least a portion of object 216, and specifically includes region 401 that is misaligned with object 216.

However, while lower resolution mesh 640 is depicted only in and around region 401 of mesh model 240, and specifically in a region of mesh model 240 corresponding to the smaller cuboid of object 216, in other implementations lower resolution mesh 640 can be applied to all of mesh model 240.

Various implementations of block 301 are contemplated herein to determine a region of mesh model 240 misaligned with a corresponding region of object 216. For example, in some implementations, determination of such regions of misalignment/or inaccuracy can occur manually, for example by controlling projectors 207 to projection map images 250 onto object 216 using mesh model 240 and visually determining regions of misalignment (e.g. as depicted in FIG. 5). Techniques described above can then be used to manually generate lower resolution mesh 640 at least in these regions, for example by visually observing inaccurate projection mapping and manually selecting high-res points in a rendering of mesh model 240 at display device 226, that correspond to the region of misalignment and/or inaccuracy.

Alternatively, determining such regions of misalignment /or inaccuracy can occur automatically, for example by comparing mesh model 240 to a point cloud corresponding to object 216; such a point cloud representing real world object 216 can be generated, for example using methods described in co-pending U.S. patent application Ser. No. 14/820,693, and mesh model 240 can be compared thereto. Alternatively, and to reduce use of processing resources, rather than compare mesh model 240 to such a point cloud, lower resolution mesh 640 can be applied to an entirety of mesh model 240, and lower resolution mesh 640 can be compared to the point cloud.

Figure 7:
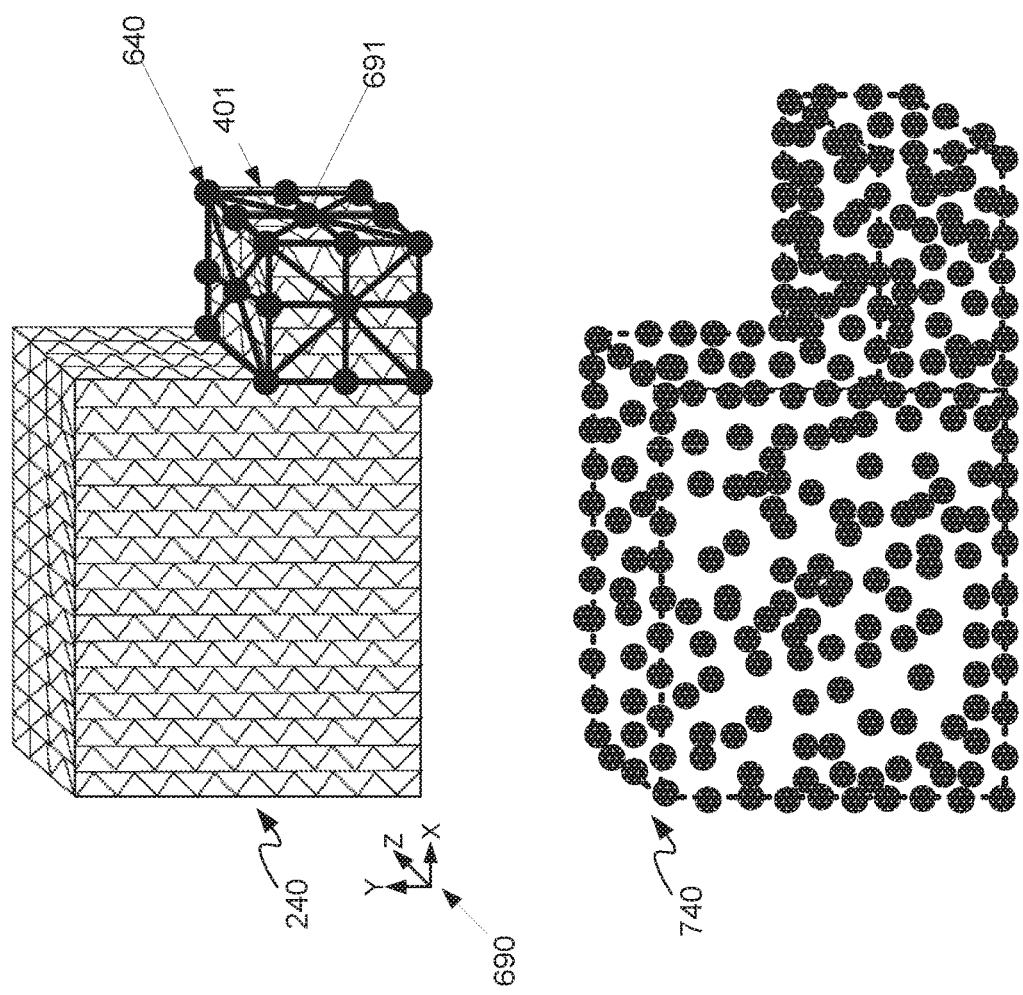
FIG. 7 depicts a comparison of the lower resolution mesh and the inaccurate mesh model, with a point cloud representing the real-world object, according to non-limiting implementations.

For example, attention is directed to FIG. 7, which depicts a graphical representation of an example point cloud 740 representing object 216 (depicted using stippled lines) as determined using system 100 and cameras 214. It is appreciated from FIG. 7 that point cloud 740 comprises a set of points that represent surfaces and edges and/or vertexes of object 216; as such, point cloud 740 can also represent a model of object 216 generated, however, from images of object 216 in-situ in environment 215, acquired by cameras 214. FIG. 7 also depicts mesh model 240 and lower resolution mesh 640 (at least in region 401). Comparing mesh model 240/lower resolution mesh 640 with point cloud 740, it is apparent that the two are misaligned at least in regions of each corresponding to region 401, similar to the comparison of mesh model 240 with object 216 depicted in FIG. 4. However, point cloud 740 comprises data that can be compared, by controller 201, with mesh model 240 and/or lower resolution mesh 640.

As such processor 220 can be further configured to determine a region 401 of mesh model 240 misaligned with corresponding region 403 of real-world object 216 by: comparing one or more of mesh model 240 and lower resolution mesh 640 with point cloud 740 representing real-world object 216. An aspect of such implementations can include one or more of orienting and resizing each of mesh model 240 and point cloud 740 relative to one another such that points and/or surfaces of each generally align.

Indeed, determining a region of misalignment/or inaccuracy can hence occur prior to applying lower resolution mesh 640 to mesh model 240, and/or after lower resolution mesh 640 has been applied to all of mesh model 240.

Controller 201 can hence be further configured to determine a region of mesh model 240 misaligned with a corresponding region of the real-world object 216 by: comparing one or more of mesh model 240 and lower resolution mesh 640 with a point cloud 740 representing real-world object 216 using any suitable technique which can include, but is not limited to, one or more of point-comparison techniques, feature matching techniques, key-feature-related techniques and normal-related techniques, and the like. However other techniques will occur to persons of skill in the art.

In particular implementations, points of mesh model 240 and/or lower resolution mesh 640 can be compared to points of point cloud 740, assuming that mesh model 240 and point cloud 740 are similarly oriented and sized; such an orientation and/or resizing can occur by comparing respective positions of points of each of mesh model 240 and point cloud 740 to determine regions that are generally similar and/or generally in alignment. Controller 201 can be configured to automatically determine a region of mesh model 240 misaligned with the corresponding region of real-world object 216 by: calculating a respective distance of each of the one or more high-res points of mesh model 240 to a respective closest point in point cloud 740 representing real-world object 216.

Alternatively, and to reduce usage of processing resources, controller 201 can be configured to automatically determine a region of mesh model 240 misaligned with the corresponding region of real-world object 216 by: calculating a respective distance of each of the one or more low-res points of lower resolution mesh 640 to a respective closest point in point cloud 740 representing real-world object 216.

Figure 8:
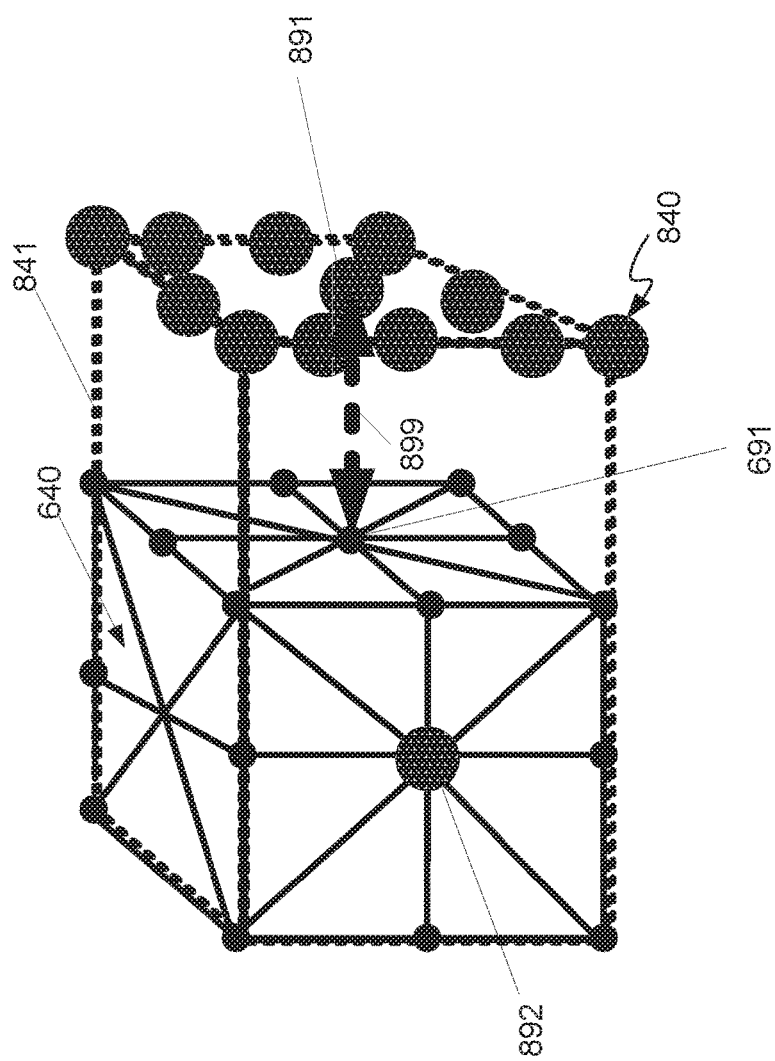
FIG. 8 depicts a comparison of a portion of the lower resolution mesh with a portion of the point cloud to determine regions of the inaccurate mesh model misaligned with corresponding regions of the real-world object, according to non-limiting implementations.

For example, attention is next directed to FIG. 8 which depicts lower resolution mesh 640, including low-res point 691, aligned with a portion 840 of point cloud 740; indeed, only portion 840 of point cloud 740 is depicted for clarity, along with an outline 841 corresponding to the smaller cuboid of object 216. It is assumed in FIG. 8 that orientation and/or resizing has already occurred, however techniques described with respect to FIG. 8 can also be used in orientation and/or resizing.

FIG. 8 also depicts a point 891 of portion 840 of point cloud 740 corresponding to a center of region 403 of object 216, as well as a distance 899 between low-res point 691 and point 891. By comparing a distance between each of low-res point 691 and other points of point cloud 740 (including, but not limited to points of portion 840 and points not in portion 840), controller 201 can determine that point 891 is a closest point of point cloud 740 to low-res point 691. When distance 899 is above a threshold value, controller 201 can determine that points 691, 891 are misaligned, and hence a corresponding region of mesh model 240 is misaligned with object 216. A similar determination can be made for each point of lower resolution mesh 640 and/or, alternatively, each point of mesh model 240. However, methods of determining misalignment and/or inaccuracies that are not strictly threshold based are within the scope of present implementations.

FIG. 8 also depicts a point 892 of point cloud 740 corresponding to a region of object 216 that is not misaligned with mesh model 240 (and/or lower resolution mesh 640); in other words, point 892 corresponds to a high-res point of mesh model 240 and/or a low-res point of lower resolution mesh 640. As the distance between point 892 and a corresponding high-res point of mesh model 240 and/or a low-res point of lower resolution mesh 640 is about 0, controller 201 can determine that a corresponding region of mesh model 240 is aligned with object 216.

A similar comparison can be made between each point of mesh model 240 and/or lower resolution mesh 640, and a respective closest point of point cloud 740.

In some implementations, controller 201 can further determine and compare normals of closest points to determine further misalignment, for example where some points align, as with point 892, but where underlying surfaces and/or vertexes are not aligned.

In any event, in these implementations, controller 201 can be further configured to automatically determine a region of mesh model 240 misaligned with a corresponding region of real-world object 216 by: calculating a respective distance of each of one or more low-res points of lower resolution mesh 640 to a respective closest point in point cloud 740 representing real-world object 216. Alternatively, though more computationally intensive, controller 201 can be further configured to automatically determine a region of mesh model 240 misaligned with a corresponding region of real-world object 216 by: calculating a respective distance of each of one or more high-res points of mesh model 240 to a respective closest point in point cloud 740 representing real-world object 216.

Figure 9:
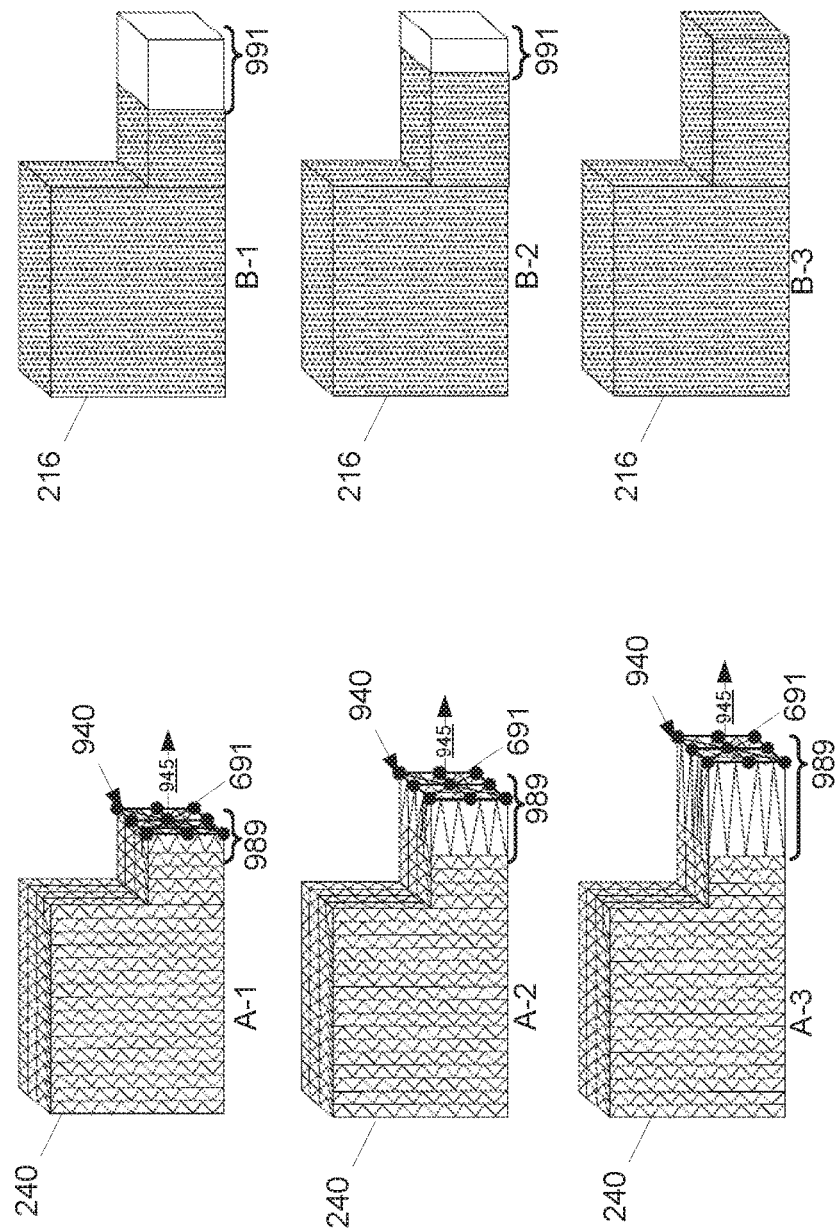
FIG. 9 depicts views of the mesh model as it is updated when one or more points of the lower resolution mesh are moved, and corresponding views of projection mapping onto the real-world object as the mesh model is updated, according to non-limiting implementations.

Attention is next directed to FIG. 9 which depicts implementations of block 303 of method 300.

In particular, FIG. 9 depicts three views A-1, A-2, A-3 of mesh model 240 as low-res point 691 of lower resolution mesh 640, only a portion 940 of which is depicted in FIG. 9, is moved according to arrow 945, as described hereafter. Portion 940 of low-res points of lower resolution mesh 640 specifically correspond to a right hand face and/or right-hand outer face and/or right hand surface of the smaller cuboid of object 216, though misaligned therewith. At least a portion of mesh model 240 is hence updated and/or changed between each of views A-1, A-2, A-3.

FIG. 9 also depicts three views B-1, B-2, B-3 of object 216 with projectors 207 projection mapping images 250 thereupon according to mesh model 240, as mesh model 240 is updated in each of respective views A-1, A2, A-3.

For example, at block 303, controller 201 can move one or more low-res points of the lower resolution mesh 640. As depicted in FIG. 9 in views A-1, A-2, A-3, low-res point 691 is moved in a direction normal to a surface that is defined (at least in part) by low-res point 691 as indicated by arrow 945, to drag low-res point 691 to align with a corresponding point and/or surface of object 216. Such movement can be accomplished manually and/or automatically. A manual implementation can occur by: rendering mesh model 240 and lower resolution mesh 640 at display device 226; selecting low-res point 691 using input device 228; and causing low-res point 691 to move based on further input from input device 228, for example in a "drag" motion.

Alternatively, controller 201 can move a position of low-res point 691 to align with point 891 of point cloud 740. Movement can stop when distance 899 there between is below a threshold value indicative of alignment, however other methods for determining alignment are within the scope of present implementations. In particular, controller 201 can be further configured to move one or more low-res points of lower resolution mesh 640 until an alignment occurs between a misaligned region of mesh model and a respective corresponding region of point cloud 740 representing real-world object 216.

Furthermore, while a simple linear movement of low-res point 691 is depicted, in other implementations, low-res points of lower resolution mesh model can be moved according to any movement that can improve accuracy of mesh model 240, including, curved movement, movement "into" and "out of" a display device, and the like.

In implementations depicted in FIG. 9, not only is low-res point 691 of lower resolution mesh 640 moved, but so is portion 940 of low-res points of lower resolution mesh 640, such that portion 940 is moved to align with a right hand face of the smaller cuboid of object 216, for example as represented by point cloud 740 and/or as represented by updated projection mapping (e.g. as depicted in views B-1, B-2, B-3). In some implementations, controller 201 can be configured to move all of portion 940 when one point in portion 940 is moved (e.g. move all points on an associated surface when one point is moved); alternatively, each point in portion 940 can be moved individually. Such movement can occur manually and/or automatically.

With regard to automatic movement of points, controller 201 can be configured to automatically move one or more low-res points of lower resolution mesh 640 to an intersection of respective lines determined from respective normals of respective vertexes of lower resolution mesh 640 and a mesh generated from point cloud 740 representing real-world object 216 until an alignment occurs between the region of mesh model 240 and a respective corresponding region of the point cloud 740.

For example, while point cloud 740 has been referred to hereafter merely with regard to a collection of points, points of point cloud 740 can be connected to form a mesh, which in turn will have vertexes and/or corners. Similarly, mesh model 240 and/or lower resolution mesh 640 has respective vertexes and/or corners. Hence, in these implementations, one or more points of lower resolution mesh 640 can be moved until respective lines determined from respective normals of vertexes of each of lower resolution mesh 640 and a mesh corresponding to point cloud 740 align. Other techniques for determining alignment will occur to persons of skill in the art.

As also depicted in views A-1, A-2, A-3 of FIG. 9, in response to low-res point 691 (and/or portion 940) being moved, corresponding high-res points of mesh model 240 are also moved, for example in a region 989 of mesh model 240, including any high-res points of mesh model 240 located between the one or more low-res points that are moved, such as low-res point 691, to increase alignment between a misaligned region of mesh model 240 and a corresponding region of real-world object 216.

In particular, high-res points between low-res points of portion 940 are moved, as well as high-res points corresponding to points of portion 940; as also seen in FIG. 9, as low-res point 691 is moved between positions in views A-1, A-2, A3, in region 989, triangles and/or polygons defining surfaces in mesh model 240 that are connected to, and/or associated with, points that are being moved, can be stretched and/or deformed to maintain continuity in mesh model 240. Alternatively, additional points of mesh model 240 can be automatically inserted into region 989 to increase a density of points and/or polygons and/or triangles (and the like) therein to maintain a resolution of mesh model 240.

Indeed, mesh model 240 can be updated in any suitable manner based on movement of low-res points of lower resolution mesh 640. Such updating can include, but is not limited to: using a transform on low-res points of lower resolution mesh 640 as an input for a multi-dimensional Gaussian function used to generate a transform of one or more corresponding high-res points of mesh model 240; using a transform on low-res points of lower resolution mesh 640 as an input for a polynomial function used to generate a transform of one or more corresponding high-res points of mesh model 240; and, using a transform on low-res points of lower resolution mesh 640 as an input for a trigonometric function used to generate a transform of one or more corresponding high-res points of mesh model 240; and the like. Such trigonometric functions can include, but are not limited to a sine function, a Fourier transform, and the like. However, such transforms are examples only any other technique for updating and/or transforming mesh model 240 based on movement of low-res points of lower resolution mesh 640 is within the scope of present implementations. Indeed, while the example object 216 depicted herein is a relatively simple rectilinear object, such transforms can be useful when the present techniques are applied to mesh models of more complex and/or curved objects An effect on projection mapping of images 250 onto object 216 is depicted in views B-1, B-2, B-3, as low-res point 691 (and/or portion 940) is moved as in corresponding views A-1, A-2, A3. In view B-1, projection mapping of images 250 is similar to that described above with respect to FIG. 5, in that projection mapping is inaccurate at least in a region 991 absent of images 250, due to misalignment between mesh model 240 and object 216. In view B-2, mesh model 240 has been updated, and/or an intermediate mesh model has been generated, based on a position of low-res point 691 (and/or portion 940) of view A-2, and projection mapping of images 250 onto object 216 becomes more accurate, as region 991 becomes smaller. Finally, in view B-3, as an updated mesh model is aligned with object 216, projection mapping is accurate and region 991 is removed and/or disappears.

Viewing of such projection mapping of images 250 onto object 216, as depicted in views B-1, B-2, B-3, can assist with moving points of lower resolution mesh 640 to align regions of mesh model 240 with object 216: while projection mapping of images 250 onto object 216 is being viewed, points of lower resolution mesh 640 can be moved and the effect on the projection mapping can be visually determined.

In other words, in such implementations, controller 201 can be further configured to control one or more projectors 207 to projection map respective images 250 corresponding to one or more intermediate updated mesh models onto real-world object 216 while the one or more low-res points of lower resolution mesh 640 are being moved.

However, at least when movement of low-res point 691 (and/or portion 940) is automatic, projection mapping onto object 216 using intermediate versions of mesh model 240 (for example as represented by view A-2) can be optional. Indeed, processing of lower resolution mesh 640 and mesh model 240 according to blocks 301, 303 can occur entirely independent of projectors 207.

Furthermore, even when movement of low-res point 691 (and/or portion 940) is manual, such movement can occur entirely independent of projectors 207: for example, when a user of system 200 is aware that mesh model 240 is inaccurate and/or simply desires to change mesh model 240, the user can manually adjust mesh model 240 using blocks 301, 303 by causing controller 201 to render mesh model 240 at display device 226 by way of providing input to input device 228. Lower resolution mesh 640 can be applied to at least a portion of mesh model 240, and also rendered at display device 226, and manual movement and/or manipulation of low-res points of lower resolution mesh 640 can cause changes to high-res points of mesh model 240, as described above. An updated mesh model can be saved in memory 222 and projection mapping of images 250 onto object 216 thereafter occurs according to the updated mesh model.

Figure 10:
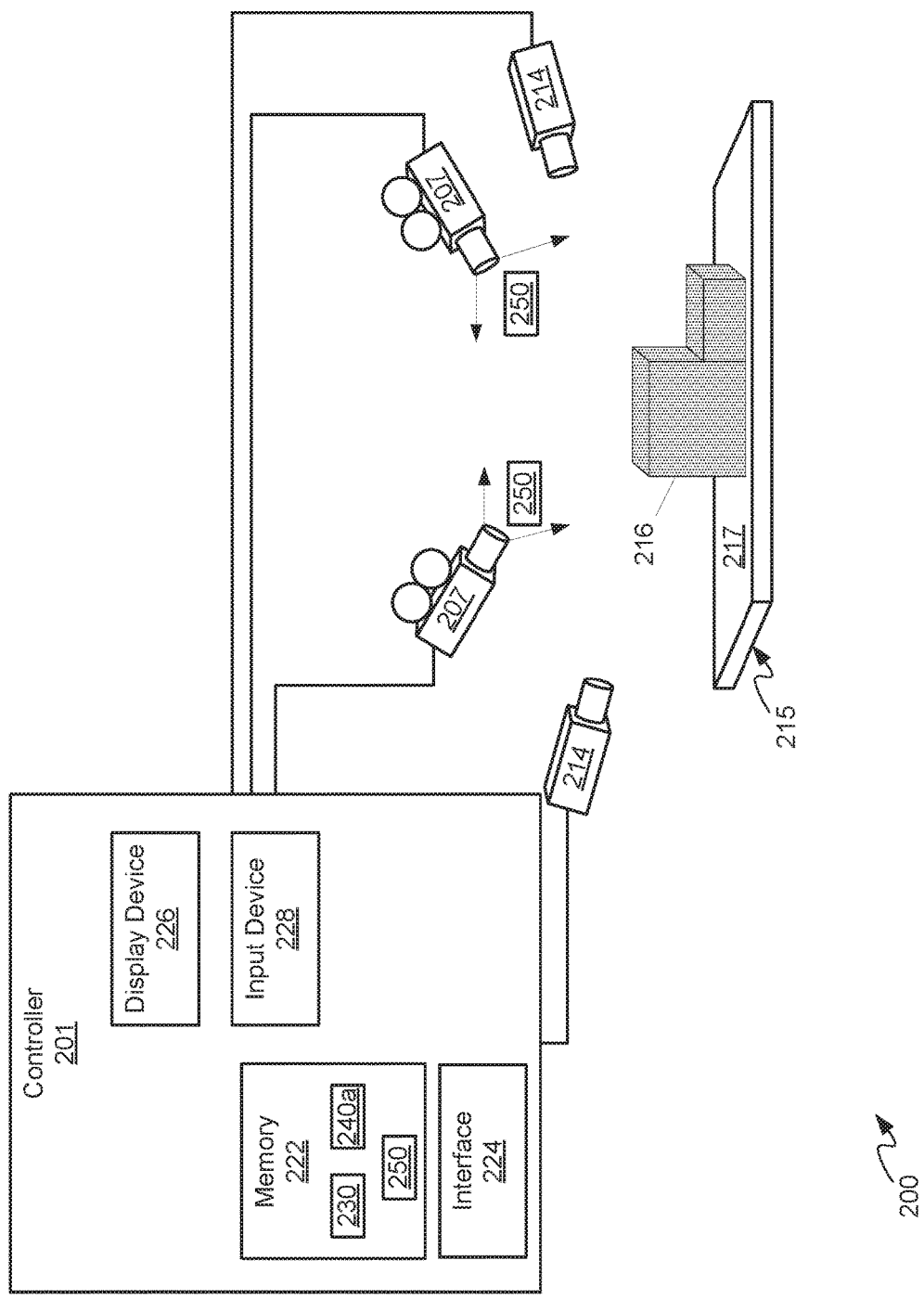
FIG. 10 depicts the system of FIG. 2 when an accurate updated mesh model of the real-world object is used to projection map onto the real-world object, according to non-limiting implementations.

For example, attention is next directed to FIG. 10, which depicts non-limiting implementations of blocks 305, 307 of method 300. In particular, it is assumed in FIG. 10 that blocks 301, 303 have been implemented and memory 222 hence stores an updated mesh model 240a based on the one or more corresponding high-res points of mesh model 240 that moved with one or more low-res points of lower resolution mesh 640. In other words, updated mesh model 240a corresponds to mesh model depicted in view A-3. In some implementations, new data defining updated mesh model 240a can be generated and store in memory 222 replacing the original mesh model 240; in other implementations, at least a portion of original mesh model 240 can be modified and/or changed (e.g. as in FIG. 9) to produce updated mesh model 240a. Regardless, updated mesh model 240a comprises a more accurate representation of object 216.

FIG. 10 also depicts projectors 207 projection mapping images 250 onto object 216, as represented by the shaded areas of object 216, similar to FIG. 5, however as accuracy of updated mesh model 240a is increased over mesh model 240, projection mapping based on updated mesh model 240a is more accurate. Hence, updated mesh model 240a used in a geometric warping correction in projection mapping, for example to warp images 250 for projection onto object 216.

Furthermore, repeating method 300 can be repeated only when real-world object 216 changes shape and/or deforms and the like, not when object 216 merely changes position relative to environment. Indeed, when object changes position, methods disclosed in co-pending U.S. patent application Ser. No. 14/820,693 can be used to generate pose data and/or object data that can be used to update the projection mapping based on the new position and on the already saved updated mesh model 240a. In other words, corrections a stored mesh model can persist at memory 222 after method 300 is implemented. Indeed, if the real world object 216 (for example, a piece is chipped off and the like), method 300 can be repeated using updated mesh model 240a as a starting point.

Those skilled in the art will appreciate that in some implementations, the functionality of system 100 and controller 201 can be implemented using pre-programmed hardware or firmware elements (e.g., application specific integrated circuits (ASICs), electrically erasable programmable read-only memories (EEPROMs), etc.), or other related components. In other implementations, the functionality of system 100 and controller 201 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive, flash storage and the like, including any hardware component configured to store computer-readable program code in a fixed, tangible, readable manner). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system comprising:
   one or more projectors configured to projection map onto a real-world object;
   a memory storing a mesh model of the real-world object and images that are to be projection mapped onto the real-world object, the mesh model being preconfigured at the memory; and,
   a controller configured to:
      apply a lower resolution mesh to the mesh model, at least in a region of the mesh model misaligned with a corresponding region of the real-world object, the lower resolution mesh having one or more of a lower resolution and a lower point density than the mesh model, wherein the region of the mesh model misaligned with the corresponding region of the real-world object is determined by: comparing the mesh model with a point cloud representing the real-world object, the point cloud obtained independently from the mesh model, and wherein the lower resolution mesh comprises one or more of: a vertex clustering simplification of the mesh model; an incremental decimation of the mesh model, and, a subset of the high-res points of the mesh model;
      move one or more low-res points of the lower resolution mesh; and, in response, move one or more corresponding high-res points of the mesh model, including any high-res points located between the one or more low-res points, to increase alignment between the region of the mesh model and the corresponding region of the real-world object;
      store an updated mesh model in the memory based on the one or more corresponding high-res points of the mesh model that moved with the one or more low-res points of the lower resolution mesh; and,
      control the one or more projectors to projection map the images corresponding to the updated mesh model onto the real-world object, the updated mesh model used in a geometric warping correction in the projection mapping, to warp the images for projection onto the real-world object.

2. The system of claim 1, further comprising an input device, wherein the controller is further configured to determine the regions of the mesh model misaligned with the corresponding regions of the real-world object by: receiving input from the input device identifying the regions.

3. The system of claim 1, wherein the lower resolution mesh is generated manually via input selecting sets of high-res points of the mesh model to be affected by a single newly created low res-point at a center of gravity of selected high-res points.

4. The system of claim 1, wherein the controller is further configured to determine the region of the mesh model misaligned with the corresponding region of the real-world object by: comparing one or more of the mesh model and the lower resolution mesh with a point cloud representing the real-world object using one or more of point-comparison techniques, feature matching techniques, key-feature-related techniques and normal-related techniques.

5. The system of claim 1, wherein the controller is further configured to automatically determine the region of the mesh model misaligned with the corresponding region of the real-world object by one or more of: calculating a respective distance of each of the one or more low-res points of the lower resolution mesh to a respective closest point in a point cloud representing the real-world object; and calculating a respective distance of each of the one or more high-res points of the mesh model to a respective closest point in a point cloud representing the real-world object.

6. The system of claim 1, wherein the controller is further configured to automatically move one or more low-res points of the lower resolution mesh to an intersection of a respective lines determined from respective normals of respective vertexes of the lower resolution mesh and a mesh generated from a point cloud representing the real-world object until an alignment occurs between the region of the mesh model and a respective corresponding region of the point cloud.

7. The system of claim 1, wherein the controller is further configured to move one or more low-res points of the lower resolution mesh until an alignment occurs between the region of the mesh model and a respective corresponding region of a point cloud representing the real-world object.

8. The system of claim 1, wherein the controller is further configured to control the one or more projectors to projection map respective images corresponding to one or more intermediate updated mesh models onto the real-world object while the one or more low-res points of the lower resolution mesh are being moved.

9. A method comprising:
at a system comprising: one or more projectors configured to projection map onto a real-world object; a memory storing a mesh model of the real-world object and images that are to be projection mapped onto the real-world object, the mesh model being preconfigured at the memory; and, a controller, applying, using the controller, a lower resolution mesh to the mesh model, at least in a region of the mesh model misaligned with a corresponding region of the real-world object, the lower resolution mesh having one or more of a lower resolution and a lower point density than the mesh model), wherein the region of the mesh model misaligned with the corresponding region of the real-world object is determined by: comparing the mesh model with a point cloud representing the real-world object, the point cloud obtained independently from the mesh model, and wherein the lower resolution mesh comprises one or more of: a vertex clustering simplification of the mesh model; an incremental decimation of the mesh model, and a subset of the high-res points of the mesh model;

moving, using the controller, one or more low-res points of the lower resolution mesh; and, in response, move one or more corresponding high-res points of the mesh model, including any high-res points located between the one or more low-res points, to increase alignment between the region of the mesh model and the corresponding region of the real-world object;

storing, using the controller, an updated mesh model in the memory based on the one or more corresponding high-res points of the mesh model that moved with the one or more low-res points of the lower resolution mesh; and, controlling, using the controller, the one or more projectors to projection map the images corresponding to the updated mesh model onto the real-world object, the updated mesh model used in a geometric warping correction in the projection mapping, to warp the images for projection onto the real-world object.

10. The method of claim 9, wherein the system further comprises an input device, and the method further comprises determining the regions of the mesh model misaligned with the corresponding regions of the real-world object by: receiving input from the input device identifying the regions.

11. The method of claim 9, further comprising generating the lower resolution mesh manually via input selecting sets of high-res points of the mesh model to be affected by a single newly created low res-point at a center of gravity of selected high-res points.

12. The method of claim 9, further comprising determining the region of the mesh model misaligned with the corresponding region of the real-world object by one or more of: comparing one or more of the mesh model and the lower resolution mesh with a point cloud representing the real-world object using one or more of point-comparison techniques, feature matching techniques, key-feature-related techniques and normal-related techniques.

13. The method of claim 9, further comprising automatically determining the region of the mesh model misaligned with the corresponding region of the real-world object by one or more of:
calculating a respective distance of each of the one or more low-res points of the lower resolution mesh to a respective closest point in a point cloud representing the real-world object; and calculating a respective distance of each of the one or more high-res points of the mesh model to a respective closest point in a point cloud representing the real-world object.

14. The method of claim 9, further comprising automatically moving one or more low-res points of the lower resolution mesh to an intersection of a respective lines determined from respective normals of respective vertexes of the lower resolution mesh and a mesh generated from a point cloud representing the real-world object until an alignment occurs between the region of the mesh model and a respective corresponding region of the point cloud.

15. The method of claim 9, further comprising moving one or more low-res points of the lower resolution mesh until an alignment occurs between the region of the mesh model and a respective corresponding region of a point cloud representing the real-world object.

16. The method of claim 9, further comprising controlling the one or more projectors to projection map respective images corresponding to one or more intermediate updated mesh models onto the real-world object while the one or more low-res points of the lower resolution mesh are being moved.

\* \* \* \* \*